United States Patent

[11] 3,601,586

[72] Inventor Peter E. Slavin
   Winchester, Mass.
[21] Appl. No. 803,289
[22] Filed Feb. 28, 1969
[45] Patented Aug. 24, 1971
[73] Assignee Intelligent Instruments, Inc.
   Winchester, Mass.

[54] THERMAL CALCULATOR
   3 Claims, 3 Drawing Figs.
[52] U.S. Cl. ................................................. 235/92 MT,
   235/92 CV, 235/92 EV
[51] Int. Cl. .................................................. G06m 3/08
[50] Field of Search ............................................ 235/92;
   340/347

[56] References Cited
   UNITED STATES PATENTS
3,316,751 5/1967 Burk .............................. 73/23.1
3,337,723 8/1967 Etnyre ........................... 235/150.27

Primary Examiner—Daryl W. Cook
Assistant Examiner—Robert F. Gnuse
Attorney—Morse, Altman & Oates ABSTRACT: A digital thermal calculator is provided for use particularly in the prediction and display of the temperature of electrical cables, especially the conductor temperature(s) of underground cables. Large currents which give power (thermal units) into the cable(s) are converted by transducers into a useable voltage, which is fed to a voltage-controlled oscillator. The output of the oscillator is fed into a reversible counter and the count in the counter represents temperature at some portion of the cable. Additional up/down counters and voltage-controlled oscillators are connected to represent heat flow between different points in the thermal system.

INVENTOR
PETER E. SLAVIN
BY
Morse, Altman & Oates
ATTORNEYS

THERMAL CALCULATOR

BACKGROUND OF THE INVENTION

1. Field of the Invention

This invention relates generally to thermal calculating devices and more particularly is directed towards a thermal calculator adapted to provide a digital readout of the temperature in the conductors of an electrical power system particularly an underground power cable.

2. History of the Prior Art

Various attempts have been made heretofore to predict accurately the temperature of an insulated electrical conductor. Electronic models of this nature customarily employ resistive networks which are subject to drift, particularly over the long time constants involved in calculating the temperature of underground electrical cables. Other techniques are also lacking in accuracy as well as reliability and ease of operation. Accordingly, it is an object of the present invention to provide a thermal calculator for use particularly with electrical power systems and adapted to predict and display in digital form the temperature of an underground cable, for example, as well as representing thermal conductance between different points associated with the system. A further object of this invention is to provide a thermal calculator adapted to simulate accurately very long time constants such as associated with the temperatures in an underground cable system.

SUMMARY OF THE INVENTION

This invention features a digital thermal calculator for use particularly with electrical power systems comprising one or more reversible digital counters each connected to a voltage-controlled oscillator with at least one of the oscillators being connected to a voltage source. Additional counters may be added to the system to increase representation of the thermal capacity and by connecting these to other points in the system the thermal flow between different points in the system may be monitored.

DESCRIPTION OF THE PREFERRED EMBODIMENT

Figure 1:
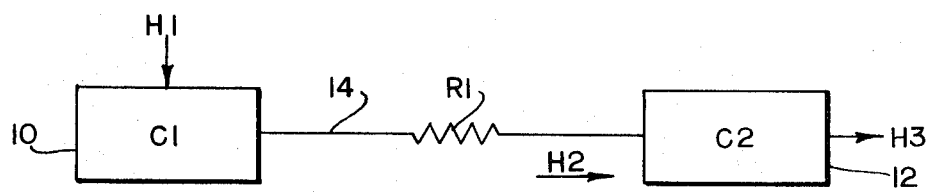
FIG. 1 is a schematic diagram demonstrating heat flow in a system.

By way of introduction, reference is first made to FIG. 1 which illustrates heat flow in a simple system. In FIG. 1 two different portions of a system are illustrated by boxes 10 and 12 connected by a thermal conductor 14. Each box represents a thermal capacity, these being C1 and C2. Assuming heat is added to thermal capacity C1 this will produce a temperature difference between C1 and C2 and this will cause heat to flow between these capacities. The temperature in C1 increasing until the heat out (H2) balances the heat in (H1). If H1 is the sole source of heat (power) in and H3 the only heat leaving the system then input multiplied by time must finally equal output multiplied by time. The rate of heat flow is determined by the temperature difference as well as the thermal resistance along the path of the conductor 14, this being represented by electrical resistance R1. Heat into the thermal capacity C1 is represented by the arrow H1 while heat out of the thermal capacity C1 into thermal capacity C2 is represented by the arrow H2. The heat out H2 varies directly as the temperature difference T1 and T2 divided by the thermal resistance R1. The temperature T1 in the thermal capacity C1 will increase until the heat out H2 balances the heat in H1. Where there is a sudden increase in the heat flow, such, for example, an increase in H1, an appreciable time will elapse before the heat flow in the system returns the system to a balanced condition when the temperatures remain the same.

Figure 2:
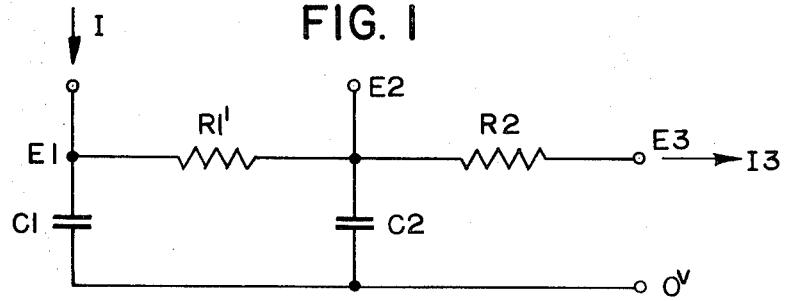
FIG. 2 is a schematic diagram showing the electrical analog of heat flow in a system, and, FIG. 3 is a schematic diagram of a digital thermal calculator made according to the invention.

The electrical analog of heat flow in the system is represented in FIG. 2 wherein current I represents heat flow, capacitors C1' and C2' correspond to thermal capacitors C1 and C2 in FIG. 1, resistors R1' and R2' correspond to the thermal resistance R1 of FIG. 1 and temperature is represented by voltages E1, E2 and E3. It will be understood that the current I will vary with heat flow and the voltage E1 will be determined by the current flow and the capacitance of capacitor of C1 as well as the value of resistor R1'. In any event whenever the circuit is out of balance there will be current flow through R1', for example, until the system returns to a balanced condition.

Figure 3:
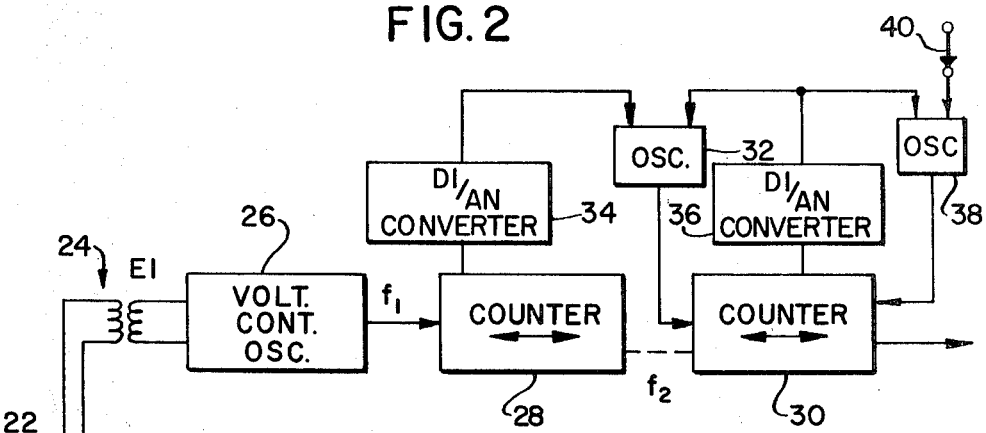

Referring now to FIG. 3 of the drawings, there is shown a digital thermal calculator made according to the invention.

In FIG. 3 an underground power cable, represented generally by the reference character 16, typically is buried in the earth to a depth on the order of 6 feet or so and normally is disposed in a bed of sand or the like. The cable 16 customarily is comprised of one or more wire conductors 18 suitably insulated and encased in a pipe 20 which also may be insulated. Connected in series to the conductor ($I^2R$) 18, preferably at the center thereof, are leads 22 to a current transformer 24, typically having a ratio on the order of 1,000 to 1, for converting the high current level in the cable to a useable voltage level for the electronic components of the calculating system.

It is well known that the heat flowing into a conductor is closely proportioned to the square of the current in that conductor, and to obtain useable data relative to the heat in the cable 16 the current is first converted by the transformer 24 to a voltage level suitable to drive a voltage-controlled oscillator 26 connected to the transformer 24. The voltage output of the transformer is thus proportional to the heat into the cable (not to confuse heat flow with heat level or temperature.) The voltage-controlled oscillator being controlled by the voltage level from the transformer will thus have a frequency output F1 which is proportional to the heat flowing into the cable. The output F1 of the oscillator 26 is then fed into a reversible counter 28 where the frequency is digitally and visually presented. Thus the count appearing on the counter 28 represents the temperature in the cable 16. Since the counter is reversible, changes in temperature will be displayed for both increases and decreases.

Delay due to thermal capacity is simulated by the length of the counter (number of decades) in the calculator. By adding a second reversible counter 30 and another voltage-controlled oscillator 32 additional information is obtainable. The additional counter and oscillator make available the digital representation of heat flow between different parts of the system. By way of explanation reference may be made to the electrical heat flow model of FIG. 2 in connection with an explanation of the diagram of FIG. 3. In FIG. 3 the oscillator 32 is provided with two voltage inputs these being ER1 and ER2 from counters 28 and 30, respectively. Each of these counters is provided with a digital to analog converter 34 and 36 which change the digital information in each counter to its voltage analog providing the controlling inputs for the oscillator 32. The difference in voltages between the two inputs to the oscillator 32 corresponds to different temperatures in different parts of the system which is being monitored. Since thermal conductance is the rate of heat flow in a system (in this case represented by a frequency) and is caused by a temperature difference between parts of the system, two or more numbers, representing two or more temperatures, are translated to a voltage difference and used then to control the frequency output of the voltage-controlled oscillator 32. Thus the count appearing on counter 30 represents heat flow from one part of the system, such as from the conductors 18, for example, to another part of the system such as the pipe 20, for example, or some external point subject to ambient temperature and having a connection to the counter 30 in a fashion similar to that for the conductors 18.

The system permits the direct digital readout of temperatures by means of the count appearing on the counters and also make possible the storage, in digital form of the past and present power levels (frequency) and temperatures (count)

and on that basis make temperature predictions. It is also possible to vary continuously and from the outside the thermal constants by varying proportional factor volts into frequency or length of counter. In FIG. 3 another voltage-controlled oscillator 38 is provided with two inputs one from the converter 36 for the counter 30 and one from a fixed or manually set input 40 which sets in temperature such as ambient. The output from the oscillator 38 feeds back to the counter 30 to subtract counts from the counter 30 corresponding to the difference between the two inputs to the oscillator 38. Furthermore, it is possible to telemeter in digital form directly from the units.

In addition to its use in connection with a power system, the calculator also may be employed as an engineering model for design and test work. The system permits the acceleration of time constants whereby the effects of design changes or other variables may be readily determined.

Having thus described the invention what I claim and desire to obtain by Letters Patent of the United States is:

1. A thermal calculator for use with electrical power cables and the like, comprising
   a. a first reversible counter,
   b. a first voltage-controlled oscillator connected to said first counter and serving as an input thereto,
   c. converting means connected to said first oscillator for converting current to voltage,
   d. conducting means connecting said converting means to said cable whereby the frequency of said first oscillator and the count on said first counter will be proportional to heat flow into said cable,
   e. a second reversible counter connected to said first counter,
   f. a digital to analog converter connected to each of said counters,
   g. a second voltage-controlled oscillator connected to both of said digital-to-analog converters and operated at the voltage difference of the outputs of the said digital-to-analog converters,
   h. the output of said second oscillator being an input to said second counter.

2. A thermal calculator according to claim 1 wherein said converting means includes a transformer.

3. A thermal calculator according to claim 1 including means providing a frequency input to said second counter proportional to the temperature of a point remote from said cable.